(12) United States Patent
Mitchell et al.

(10) Patent No.: US 8,435,409 B2
(45) Date of Patent: May 7, 2013

(54) ACTIVATED SLUDGE PROCESS IN WASTEWATER TREATMENT

(75) Inventors: David B. Mitchell, Yardley, PA (US);
Daniel J. Wagner, Pittsford, NY (US);
Kojo Arthur-Mensah, Highland, NY (US)

(73) Assignee: Ecolab USA Inc., St. Paul, MN (US)

( * ) Notice: Subject to any disclaimer, the term of this patent is extended or adjusted under 35 U.S.C. 154(b) by 427 days.

(21) Appl. No.: 12/790,326

(22) Filed: May 28, 2010

(65) Prior Publication Data

US 2011/0290722 A1 Dec. 1, 2011

(51) Int. Cl.
*C02F 3/00* (2006.01)

(52) U.S. Cl.
USPC ............ 210/607; 210/623; 210/624; 210/630

(58) Field of Classification Search .......... 210/620–622, 210/221.1, 607, 623–624, 630
See application file for complete search history.

(56) References Cited

U.S. PATENT DOCUMENTS

| | | |
|---|---|---|
| 3,652,406 A | 3/1972 | Westberg |
| 3,806,448 A | 4/1974 | Hood |
| 4,073,722 A | 2/1978 | Grutsch |
| 4,076,615 A | 2/1978 | Olesen |
| 4,168,228 A | 9/1979 | Mallatt |
| 4,172,781 A | 10/1979 | Walk |
| 4,207,179 A | 6/1980 | McCarthy |
| 4,237,002 A | 12/1980 | Strudgeon |
| 4,292,176 A | 9/1981 | Grutsch |
| 4,568,462 A | 2/1986 | Bohnke |
| 4,728,517 A | 3/1988 | Markham |
| 4,755,296 A | 7/1988 | Ying |
| 4,784,770 A | 11/1988 | Nagao |
| 4,913,820 A | 4/1990 | Kawabata |
| 5,068,036 A | 11/1991 | Li |
| 5,213,681 A | 5/1993 | Kos |
| 5,282,980 A | 2/1994 | Kew |
| 5,374,358 A | 12/1994 | Kaniecki |
| 5,447,633 A | 9/1995 | Matsche |
| 5,514,278 A | 5/1996 | Khudenko |
| 5,650,069 A | 7/1997 | Hong |
| 5,846,425 A | 12/1998 | Whiteman |
| 5,906,746 A | 5/1999 | Helmo |
| 6,120,687 A * | 9/2000 | Oyzboyd ..................... 210/626 |
| 6,238,564 B1 | 5/2001 | Tanaka |
| 6,402,065 B1 | 6/2002 | Higgins |
| 6,585,895 B2 | 7/2003 | Smith |

(Continued)

FOREIGN PATENT DOCUMENTS

| | | |
|---|---|---|
| EP | 849230 | 6/1998 |
| GB | 1516673 | 7/1978 |

(Continued)

OTHER PUBLICATIONS

Gerardi, "Settleability Problems and Loss of Solids in the Activated Sludge Process," pp. 3-36, 43-62, 99-109, 115-128, and 139-145 (2002).

(Continued)

*Primary Examiner* — Chester Barry
(74) *Attorney, Agent, or Firm* — Merchant & Gould PC

(57) ABSTRACT

The present disclosure relates to methods of treating highly contaminated wastewater using waste activated sludge as an adsorbent.

13 Claims, 1 Drawing Sheet

U.S. PATENT DOCUMENTS

| | | | |
|---|---|---|---|
| 6,623,643 | B2 | 9/2003 | Chisholm et al. |
| 6,773,597 | B2 | 8/2004 | Zhang |
| 6,818,131 | B2 | 11/2004 | Sha |
| 6,893,566 | B2 | 5/2005 | Fassbender |
| 6,921,486 | B2 | 7/2005 | Hough |
| 6,946,073 | B2 | 9/2005 | Daigger |
| 7,153,431 | B2 * | 12/2006 | Daugherty .................. 210/622 |
| 7,172,701 | B2 | 2/2007 | Gaid |
| 7,481,934 | B2 | 1/2009 | Skillicorn |
| 7,569,148 | B2 | 8/2009 | Elefritz |
| 7,625,490 | B2 | 12/2009 | Cort |
| 2006/0027495 | A1 | 2/2006 | Hough |
| 2007/0187329 | A1 | 8/2007 | Moller |

FOREIGN PATENT DOCUMENTS

| | | |
|---|---|---|
| JP | 5-50091 | 3/1993 |
| JP | 6-170388 | 6/1994 |
| JP | 11-267689 | 10/1999 |
| KR | 10-0170038 | 2/1999 |
| KR | 10-0248874 | 3/2000 |
| WO | WO 2008/051546 | 5/2008 |

OTHER PUBLICATIONS

Wang et al., "Waste Treatment in the Food Processing Industry," pp. 51-192 and 255-289 (2006).

Tillman, "Primary Treatment at Wastewater Treatment Plants," pp. 1-26 (1992).

Lal et al, "Wealth from Waste: Trends and Technologies," *Chptr. 10, Industrial effluents: bioreactors for treatment of wastes*, Ramasamy and Doraisamy, pp. 411-444 (2005).

Eikelboom, "Process Control of Activated Sludge Plants by Microscopic Investigation," pp. 7-8, 29-41, 103-118, and 127-143 (2000).

International Search Report and Written Opinion mailed Feb. 16, 2012.

Rosa et al., "Production and Utilization of a Novel Solid Enzymatic Preparation Produced by Penicillium restrictum in Activated Sludge Systems Treating Wastewater with High Levels of Oil and Grease.", *Environmental Engineering Science*, vol. 23, No. 5, pp. 814-823, (2006).

Teodosiu et al., "Evaluation of secondary refinery effluent treatment using ultrafiltration membranes", *Water Research*, vol. 33, Issue 9, Jun. 1999, pp. 2172-2180.

Viitasaari et al., "Dissolved Air Floatation in the Treatment of Industrial Wastewaters with a Special Emphasis on Forest and Foodstuff Industries", *Wat. Sci. Tech.*, vol. 31, No. 3-4, pp. 299-313, 1995.

Al-Mutairi et al., "Evaluation study of slaughterhouse wastewater treatment plant including contact-assisted activated sludge and DAF", *Desalination*, vol. 225, 2008, pp. 167-175.

* cited by examiner

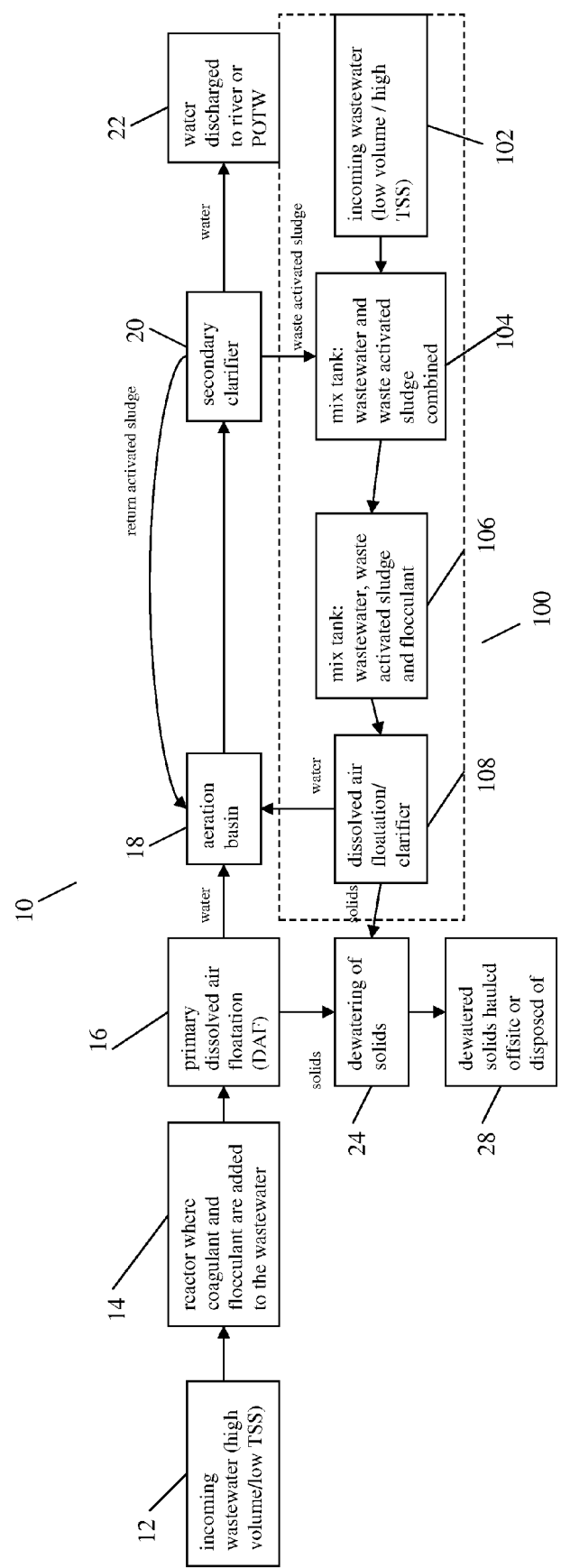

ACTIVATED SLUDGE PROCESS IN WASTEWATER TREATMENT

FIELD

The present disclosure relates to methods of treating highly contaminated wastewater using waste activated sludge as an adsorbent.

BACKGROUND

In a waste treatment process, contaminants need to be removed before disposal. Insoluble contaminants can be physically separated and disposed of and soluble contaminants can be biologically metabolized. Bacteria may be used to break down or metabolize the soluble contaminants. The bacteria are often part of a composition called activated sludge. Once the bacteria have been used to break down the soluble contaminants, a portion of the activated sludge, referred to as return activated sludge, is recycled back into the process to continue metabolizing contaminants in the waste stream. The rest of the waste activated sludge is usually disposed of.

In another part of the waste treatment process, chemical coagulants may be used to aggregate insoluble and a small percentage of soluble contaminants (<15%) for separation and removal. Chemical coagulants are expensive.

SUMMARY

Surprisingly, waste activated sludge has been found to be useful for treating highly concentrated waste streams. Instead of being disposed of, the waste activated sludge can be recycled and combined with highly concentrated waste streams for short periods of time. While combined, the bacteria in the waste activated sludge does not metabolize the waste stream. Rather, the waste adsorbs onto the bacteria.

Accordingly, in a first embodiment, the disclosed method includes providing a waste stream comprising contaminants, providing waste activated sludge in an amount that is at least about 10% of the volume of the waste stream, the waste activated sludge comprising at least about 1% bacterial concentration, combining the waste stream and the waste activated sludge for a limited period of time, and allowing the contaminants in the waste stream to adsorb onto the bacteria in the waste activated sludge.

In another embodiment, the disclosed method includes providing a first waste stream comprising less than 1% and preferably less than 0.5% or 5,000 ppm contaminants, providing a second waste stream comprising greater than 2% or 20,000 ppm contaminants, defined as soluble COD (chemical oxygen demand) with a high fats, oils, and grease content (>1,000 ppm), transporting the first waste stream to an aeration basin comprising bacteria, transporting the first waste stream and the bacteria from the aeration basin to a clarifier, dividing the bacteria in the clarifier into at least a first portion of bacteria (return activated sludge), and a second portion of bacteria (waste activated sludge), sending at least a portion of the return activated sludge to the aeration basin, sending at least a portion of the waste activated sludge to a mix tank, combining the second waste stream and the waste activated sludge in the mix tank for less than 10 minutes, and allowing the contaminates in the second waste stream to adsorb onto the waste activated sludge.

BRIEF DESCRIPTION OF THE DRAWINGS

FIG. 1 shows a flowchart diagram of a wastewater treatment process using the disclosed method of treating highly contaminated waste streams with waste activated sludge.

DETAILED DESCRIPTION

The present disclosure relates to methods of treating highly contaminated waste streams using waste activated sludge. Influent waste streams typically contain a combination of liquid and solid contaminants from a variety of sources including municipal waste (i.e., raw sewage or wastewater), industrial waste, food processing waste, pharmaceutical waste, and the like. Food processing waste in particular includes various fats, salts, sugars, starches, proteins, and the like. All types of waste include both soluble and insoluble contaminants and eventually, all of these contaminants need to be removed before the water can be disposed of into the environment (i.e., lakes, rivers, or public owned treatment works plants (POTW's)).

Current industrial wastewater treatment processes are equipped to handle high volumes of wastewater along the lines of 20,000 to 10,000,000 gallons of wastewater flow per day, typically 50,000 to 1,500,000 gpd in the food industrial sector. Further, current wastewater treatment processes are equipped to handle conventional wastewater streams with about 100 to about 1000 ppm of total suspended solids (TSS), and a concentration of oils, fats, and grease from about 10 to about 400 ppm. However, some wastewater influent streams are highly contaminated, meaning that they have significantly higher total suspended solids and oils, fats, and grease. One way to process highly contaminated streams like this is to increase the amount of chemicals used in a conventional wastewater treatment process. But, this can significantly add to the treatment cost. Further, highly contaminated streams can disrupt a conventional treatment process by favoring the growth of certain organisms that are held in balance by the growth of "useful" floc-forming heterotrophic bacteria under typical influent contaminant (food) concentrations. Influent wastewater with high concentrations of oils fats and grease favors the growth and reproduction of certain organisms such as nocardia, which can cause significant operational and treatment performance problems as a result of a thick foam scum formation for weeks or months after the introduction of these concentrated contaminants (e.g. oils, fats, and grease).

Highly Contaminated Waste Stream

The method of the present disclosure works best with a highly contaminated waste stream. Exemplary waste streams include those coming out of a food processing plant such as a dairy plant, poultry plant, or meat plant. Highly contaminated waste streams include at least about 5,000 ppm biochemical oxygen demand (BOD), preferably >10,000 ppm BOD or at least about 7,500 ppm chemical oxygen demand (COD), preferably >20,000 ppm or at least about 1000 ppm fats, oils and grease (FOG), or at least about 1000 ppm total suspended solids (TSS)

Waste Activated Sludge

"Activated sludge" includes bacteria. The activated sludge is part of a multi-step process described in FIG. 1 and discussed below. When breaking down the soluble contaminants, a traditional waste stream contacts the activated sludge in a reactor. The bacteria digest the contaminants and metabolize the contaminants into cellular structures and intermediate products. At the same time, the bacteria reproduce. A constant bacterial population, sometimes referred to as the "mixed liquor suspended solids" is desired in the reactor. Next, the decontaminated stream and the activated sludge are transported to a clarifier. While in the clarifier, the bacterial solids separate from the decontaminated stream by gravity. Some of the bacterial solids are recycled to an aeration basin and traditionally some have to be wasted (disposed of). The recycled bacterial solids are referred to as "return activated sludge" and the wasted bacteria are referred to as "waste activated sludge."

In the disclosed method, instead of being disposed of, a portion of the waste activated sludge is collected and used to treat the highly contaminated waste stream. In other words, the highly contaminated waste stream and the waste activated sludge are combined for a limited period of time. The time period preferably does not exceed 10 minutes, and is typically less than 5 minutes.

The waste activated sludge used in the disclosed method includes bacteria at a concentration from about 10,000 ppm to about 30,000 ppm mixed liquor suspended solids where up to 20% of these solids can be inorganic solids or dead bacterial cells. Exemplary indicator bacteria that are found in the waste activated sludge include aerobic bacteria such as amoeba, ciliates, crawling ciliates, stalked ciliates, rotifers, and the like. The active bacteria may consist of heterotrophs, autotrophs, and nitrifying bacteria such as nitrosomas, nitrobacter etc. Waste anaerobic bacteria such as methanostrata and methanosaeta and facultative bacteria (designated as WAnS) or a combination of aerobic and anaerobic could also be used although aerobic WAS (waste activated sludge) matrices are preferred. The waste activated sludge preferably contains a bacterial concentration or volatile suspended solids concentration of 5,000 ppm and typically >20,000 ppm or 2%. The total suspended solids for the WAS is preferably from about 10,000 to about 40,000 ppm, and about 20,000 to about 30,000 ppm. The pH of the WAS is preferably from about 4 to 10, about 5 to 9, or about 6 to 8.

Method of Treating the Waste Stream

Referring to FIG. 1, the disclosed wastewater treatment method 10 includes two sources of incoming wastewater: the typical high volume/low TSS influent stream 12, and the low volume/high TSS highly contaminated influent stream 102. As previously discussed, the influent stream 12 can come from a variety of sources such as municipal waste (i.e., raw sewage or wastewater), industrial waste, food processing waste, pharmaceutical waste, and the like. Influent stream 12 contains less than about 4000 ppm, less than about 2000 ppm, or less than about 1000 ppm TSS and includes from about 20,000 to 4,000,000 gpd, about 500,000 to 1,000,000 gpd, and from about 100,000 to 500,000 gallons of wastewater per day. Influent stream 12 includes solid, liquid, soluble, and insoluble contaminants.

In the treatment process 10, influent stream 12 is transferred to a reactor 14 where the flocculants and coagulants are added to group the contaminants together. Reactor 14 can be a tank or a series of flocculation tubes. After the contaminants are grouped together in reactor 14 the stream is transferred to a dissolved air floatation (DAF) reactor 16.

In the DAF 16 the grouped contaminants are floated to the top of the DAF where they can be separated from the liquid. The solids are collected off the top of the DAF 16 and transferred for dewatering 24. The liquid from the DAF 16 is transferred to an aeration basin 18.

While in the aeration basin 18 the liquid is combined with return activated sludge from the secondary clarifier 20. The return activated sludge includes similar bacteria as the waste activated sludge. The liquid remains in the aeration basin 18 for about 4 to about 24 hours. While in the aeration basin 18 the bacteria in the return activated sludge break down the remaining soluble contaminants. The bacteria digest the contaminants and metabolize the contaminants into cellular structures and intermediate products. After the bacteria have had sufficient time to digest the contaminants in the aeration basin 18 the digested contaminants, water, and return activated sludge are transferred to a secondary clarifier 20.

While in the clarifier 20 the digested contaminants and activated sludge are separated from the water by gravity. After approximately 1.5 to 4 hours of settling a portion of the activated sludge is sent back to the aeration basin 18 as return activated sludge to continue digesting contaminants, and a portion of the activated sludge is sent to mix tank 104 as waste activated sludge to process the highly contaminated waste stream from incoming waste stream 102. The remaining solids in clarifier 20 are collected for dewatering 24 (not shown). Finally, the decontaminated water in clarifier 20 is ready for disposal either directly into the environment or to a publicly owned treatment works (POTW) plant 22.

The solids from the DAF 16, the clarifier 20, and the DAF 108 are collected and dewatered 24. Dewatering further concentrates the solids and reduces the volume of waste that has to be transported from the facility, which is very expensive. Dewatering can occur by using a belt press, a centrifuge, and decanting.

After dewatering, the concentrated solids are transported offsite 28 to be disposed of. The solids can be sent to a landfill, the solids can be spread on land as fertilizer, or composted. Water that is removed during the dewatering process 24 is sent to the aeration basin 18 to be processed by the return activated sludge (not shown).

Turning now to the treatment of the highly contaminated waste stream, shown generally at 100, the low volume/high TSS highly contaminated influent stream 102 can come from a variety of sources such as municipal waste (i.e., raw sewage or wastewater), industrial waste, food processing waste, pharmaceutical waste, and the like. Influent stream 102 is different from influent stream 12 in that it contains at least about 100,000, at least about 50,000, or at least about 1,000 TSS where 5,000 to 30,000 ppm of TSS is preferred and includes from about 1,000 to 50,000 gpd, from about 10,000 to about 40,000 gpd, and from about 15,000 to about 30,000 gallons of wastewater per day. The influent stream 102 can also include a concentration of fats, oils, and grease of at least about 50 ppm, about 500 ppm, and about 5,000 ppm. It can also include a BOD level of at least about 5,000 ppm, 10,000 ppm, and 40,000 ppm. Finally, the influent stream 102 can include a COD of at least about 10,000 ppm, 20,000 ppm, and 80,000 ppm. Influent stream 102 includes solid, liquid, soluble, and insoluble contaminants.

Influent stream 102 is transferred to a mix tank 104 where it is combined with waste activated sludge for a limited period of time. Exemplary time periods include less than about 30 minutes, less than about 15 minutes, less than about 10 minutes, less than about 5 minutes, and less than about 1 minute. While not wishing to be bound by theory, the waste activated sludge is not combined with the waste stream for a period of time long enough for the bacteria in the waste activated sludge to metabolize the contaminants in the waste stream. Rather, the waste activated sludge serves as a type of biological coagulant or adsorbent where the contaminants adsorb onto the surface of the bacteria in the waste activated sludge. When bacteria are used to metabolize the waste, for example in the aeration basin 18, the waste stream and bacteria are mixed together for long periods of time, for example 4-24 hours. In contrast, during the short period of time in the disclosed method, the contaminants physically adsorb onto the bacteria without being metabolized.

Because of the relationship between the bacteria in the waste activated sludge and the contaminants in the highly concentrated waste stream, the waste activated sludge and the waste stream are preferably present in a ratio of at least 1:7, 1:2, or 1:1. These preferred ratios allow for enough bacteria in the waste activated sludge to be present to adsorb the most contaminants from the waste stream 102.

Once the contaminants adsorb onto the bacteria in mix tank 104, the stream is transferred to mix tank 106 and a flocculant is added to coalesce the bacteria-contaminants. The coalesced bacteria-contaminants are then transferred to a dissolved air floatation unit or clarifier 108. While in the DAF or clarifier 108 the solids are separated from the liquids. In an embodiment, at this point, enough of the concentrated contamination has been removed using the waste activated sludge and the solid and liquid portions of the waste stream can be joined with the rest of the process. For example the solids can be transferred to be dewatered 24 and the liquids can be transferred to the aeration basin 18. Once transferred be dewatered 24 or the aeration basin 18 the solids and liquids respectively then follow the process with the influent stream 12. Alternatively, the influent stream 102 can always be kept separate from influent stream 12 and follow a similar path of processing in separate equipment. Finally, influent stream 102 could be the only stream in the plant. That is, the waste processing process 10 could only involve a highly contaminated stream 102 and not have an influent stream 12.

Without the disclosed method, a large volume of coagulant would be needed to separate out the high concentration of contaminants from influent stream 102. However, one advantage of the disclosed method is that it greatly reduces or eliminates the need for a chemical coagulant. In some embodiments, it may be necessary to include a chemical coagulate, particularly for certain contaminants or phosphorus removal. In these embodiments, a reduced concentration of coagulates can be used, compared to a system that does not use waste activated sludge. In some embodiments, the disclosed method uses from about 3 parts of coagulant to about 9 parts of coagulant for every part of phosphorus that needs to be removed. In some embodiments, this can be 50% up to 100% less coagulant, compared to a system that does not use waste activated sludge. In some embodiments, the method uses less than 50 ppm of coagulant as part of the treatment of the highly contaminated waste stream 100. In an embodiment, method 100 is free or substantially free of any chemical coagulant. Various commercially available coagulants chemistries that can be used include aluminum chlorohydrate polymers, polymeric aluminum chlorides, dimethylamine epichlorohydrins, and blends of the above polymers with dimethyldiallyl ammonium chloride.

EXAMPLES

Example 1

Example 1 describes the costs of using a chemical coagulant to treat a highly contaminated waste stream.

A highly contaminated waste stream (37,000 gpd) was evaluated to determine if chemical coagulants could be used to treat the increased contamination. The results are shown in Table 1. Typical COD, oils, fats, and grease, and TSS concentrations of the waste stream were 85,560 ppm, 2,100 ppm and 21,333 ppm respectively.

TABLE 1

Estimated Coagulant Chemical Costs

| Coagulant | Coagulant Concentration for the Waste Stream | Waste Stream Flow Rate | Estimated Coagulant Annual Cost |
| --- | --- | --- | --- |
| aluminum chlorohydrate polymer | 5000 ppm | 37,000 gpd | $185,806 |

Table 1 shows that the chemical coagulant adds $185,806 in raw material costs to the waste treatment process if used to treat a highly contaminated waste stream.

Example 2

Example 2 examined the effectiveness of the method at treating a highly contaminated waste stream. The method was tested on a waste stream from a pet food processing plant. The waste stream had a flow rate of 30,000 gpd and an influent COD of 36,080 ppm. The waste activated sludge had a flow rate of 6,000 gpd (3,000 average), and a bacterial concentration of 10,000 ppm. The waste stream and the waste activated sludge were combined. The ratio of the waste activated sludge to the influent flow had an average of 10% and a maximum of 20%. A cationic polyacrylamide flocculant was then added. Exemplary cationic polyacrylamide flocculants are commercially available from Kemira, Ciba (BASF), Stockhausen, and SNF Floerger. No chemical coagulant was used during this process. The results are shown in Table 2.

TABLE 2

| Effectiveness of Waste Activated Sludge on COD Removal | |
| --- | --- |
| Starting COD | 36,080 ppm |
| COD at 5 minutes (without polymer flocculant) | 6630 ppm |
| COD after 5 minutes of polymer flocculant addition | 6140 ppm |
| Pounds of COD per day | 8941 |
| Pounds of COD removed by adsorption on to waste activated sludge | 7116 |
| Additional COD removed with the polymer flocculant | 11.01 |
| Total COD removed | 7127 |
| % COD removed via adsorption | 79.7% |

Table 2 shows that waste activated sludge is a preferred alternative to chemical coagulants which can add significant solids requiring disposal and are effective at removing a significant percentage of the COD.

In some embodiments, it may be desirable to use a chemical coagulant to remove certain contaminants or phosphorus. Ferric chloride can be used as a coagulant with this method at 50% up to 100% reduced dosage. This allows the ferric dose to be reduced by 50% if phosphorus is a concern or 100% if phosphorus is not a concern and only BOD, COD and oils, fats, and grease are target contaminants for removal. In these embodiments, the coagulant can be added after the WAS is combined with the waste stream and before the flocculant addition.

Example 3

Example 3 examined the effectiveness of the method at treating a highly contaminated waste stream. The method was tested on a waste stream from a food processing plant. The waste stream had a flow rate of 37,000 gpd and an influent COD of 85,560 ppm. The waste activated sludge had a flow rate of 35,000 gpd, and a bacterial concentration of 20,000 ppm. The waste stream and the waste activated sludge were combined. The ratio of the waste activated sludge to the influent flow had an average of 33% and a maximum of 50%. A cationic polyacrylamide flocculant was then added. The results are shown in Table 3. No chemical coagulant was used during this process.

TABLE 3

Effectiveness of Waste Activated Sludge on COD Removal

| | |
|---|---|
| Starting COD | 85,560 ppm |
| COD after the addition of the waste activated sludge | 57,403 ppm |
| COD after 5 minutes of polymer flocculant addition | 32,748 ppm |
| Pounds of COD per day | 17,713 |
| Total COD removed | 7,608 |
| % COD removed via adsorption | 43% |

Table 3 shows that waste activated sludge is a preferred alternative to chemical coagulants and effective at removing a significant percentage of the COD.

Example 4

Example 4 examined the effectiveness of the method at treating a highly contaminated waste stream. The method was tested on a waste stream from the poultry truck washing area of a poultry processing plant. The waste stream had a flow rate of 14,000 gpd and an influent COD of 2,200 ppm. The waste activated sludge had a flow rate of 22,000 gpd, and a bacterial concentration of 5,000 ppm. The waste stream and the waste activated sludge were combined. The ratio of the waste activated sludge to the influent flow had an average of 50% and a maximum of 61%. A cationic polyacrylamide flocculant was then added. The results are shown in Table 4. No chemical coagulant was used during this process.

TABLE 4

Effectiveness of Waste Activated Sludge on COD Removal

| | |
|---|---|
| Starting COD | 2,200 ppm |
| COD at 5 minutes (without polymer flocculant) | 1,060 ppm |
| COD after 5 minutes of polymer flocculant addition | 900 ppm |
| Pounds of COD per day | 266 |
| Pounds of COD removed with the polymer flocculant | 116 |
| % COD removed via adsorption | 43.6% |

Table 4 shows that waste activated sludge is a preferred alternative to chemical coagulants and effective at removing a significant percentage of the COD.

Example 5

Example 5 examined the effectiveness of the method at treating a highly contaminated waste stream and compared it to treatment with a traditional coagulant and flocculant system. The method was tested on a waste stream from a potato chip manufacturing plant. The waste stream had a flow rate of 25,000 gpd and an influent COD of 9,390 ppm.

For the coagulant treatment, the waste stream was treated with 600 ppm of an aluminum chlorohydrate polymer coagulant and then treated with 10 ppm of a anionic polyacrylamide flocculant.

For the waste activated sludge treatment, the waste activated sludge had a flow rate of 4,000 gpd, and an estimated bacterial concentration of 2%. The waste stream and the waste activated sludge were combined. The ratio of the waste activated sludge to the influent flow was approximately 16%. A cationic polyacrylamide flocculant was then added. The results are shown in Table 5. No chemical coagulant was used during the waste activated sludge process.

TABLE 5

Effectiveness of Waste Activated Sludge on COD Removal

| | With Coagulant | With WAS |
|---|---|---|
| Starting COD | 9,390 ppm | 9,390 ppm |
| COD after treatment | 4,870 ppm | 3,910 ppm |
| % COD | 48% | 58% |
| Estimated treatment costs | $41,085/year | $1,287/year |

Table 5 shows that waste activated sludge is a preferred alternative to chemical coagulants and effective at removing a significant percentage of the COD. It also shows that it is more cost effective.

The above specification, examples and data provide a complete description of the invention. Since many embodiments of the invention can be made without departing from the spirit and scope of the invention, the invention resides in the claims.

We claim:
1. A method of treating a waste stream comprising:
   (a) providing a waste stream comprising contaminants;
   (b) providing waste activated sludge in an amount that is at least about 15% of the volume of the waste stream, the waste activated sludge comprising at least about 1% bacterial concentration;
   (c) mixing the waste stream and the waste activated sludge for no more than 5 minutes before adding a flocculant; and
   (d) adding flocculant to the combined waste stream and waste activated sludge.
2. The method of claim 1, wherein the contaminants make up at least about 0.5% of the waste stream.
3. The method of claim 1, wherein the contaminants make up at least about 3% of the waste stream.
4. The method of claim 1, wherein the method uses less than 50 ppm of a chemical coagulant.
5. The method of claim 1, wherein the method does not use any chemical coagulant.
6. The method of claim 1, further comprising:
   (a) separating any solids; and
   (b) disposing of the solids.
7. The method of claim 1, wherein the waste activated sludge is at least about 25% of the volume of the waste stream.
8. The method of claim 1, wherein the waste activated sludge comprises at least about 2% bacterial concentration.
9. The method of claim 1, wherein the waste activated sludge comprises at least about 3% bacterial concentration.
10. The method of claim 1, wherein the waste stream is from a food processing plant.
11. The method of claim 1, wherein the bacteria are aerobic.
12. The method of claim 1, wherein the bacteria are anaerobic.
13. A method of treating a waste stream comprising:
   (a) providing a first waste stream comprising less than 4,000 ppm total suspended solids;
   (b) providing a second waste stream comprising greater than 1,000 ppm total suspended solids;
   (c) transporting the first waste stream to an aeration basin comprising bacteria;
   (d) transporting the first waste stream and the bacteria to a clarifier;

(e) dividing the bacteria in the clarifier into at least a first portion of bacteria called return activated sludge, and a second portion of bacteria called waste activated sludge;
(f) transporting the return activated sludge to the aeration basin;
(g) transporting the waste activated sludge to a mix tank;
(h) mixing the second waste stream and the waste activated sludge in the mix tank for less than 10 minutes before adding flocculant; and
(i) adding flocculant to the combined second waste stream and waste activated sludge.

* * * * *